Figure 1:
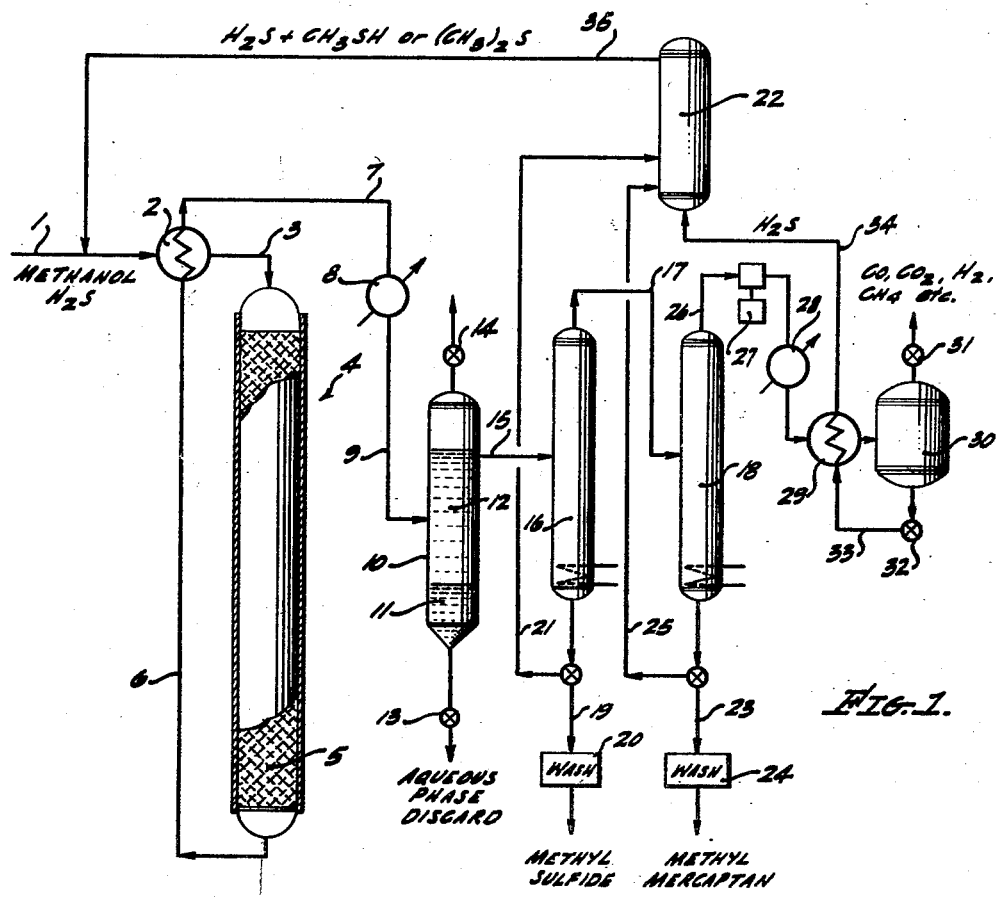

United States Patent Office 2,816,146
Patented Dec. 10, 1957

2,816,146

PREPARATION OF ORGANIC SULFIDES

Thomas F. Doumani, Whittier, Calif., assignor to Union Oil Company of California, Los Angeles, Calif., a corporation of California Application April 6, 1953, Serial No. 347,103

14 Claims. (Cl. 260—609)

This invention relates to the preparation of lower aliphatic mercaptans and/or thio-ethers by the interaction of lower alkanols with hydrogen sulfide at high temperatures and in the presence of a solid adsorbent catalyst. When mercaptans are principally desired, certain non-acidic, substantially neutral catalysts are employed, and the initial mole-ratio of hydrogen sulfide to alkanol is between about 1 and 3 while a molar excess of the corresponding thio-ether is maintained in the reaction mixture. When thio-ethers are primarily desired, certain acidic, cracking type catalysts are employed, and the initial mole ratio of hydrogen sulfide to alkanol is between about 0.5 and 1 while a molar excess of the corresponding mercaptan is preferably maintained in the reaction mixture. The invention also embraces other procedural details which will be more particularly described hereinafter.

The general reaction for producing mercaptans is as follows:

$$ROH + H_2S \rightleftharpoons RSH + H_2O + \Delta \qquad (1)$$

Thio-ethers, or sulfides, are apparently produced primarily through the following reaction mechanism:

$$2ROH \rightleftharpoons ROR + H_2O + \Delta \qquad (2)$$

$$ROR + H_2S \rightleftharpoons R_2S + H_2O + \Delta \qquad (3)$$

Simultaneous reactions which may lead to the formation of either thio-ethers or mercaptans, depending upon the position of equilibrium, are as follows:

$$2ROH + H_2S \rightleftharpoons R_2S + 2H_2O + \Delta \qquad (4)$$

$$2RSH \rightleftharpoons R_2S + H_2S + \Delta \qquad (5)$$

$$RSH + ROH \rightleftharpoons R_2S + H_2O + \Delta \qquad (6)$$

In addition to the above reactions other undesirable side reactions occur to a greater or lesser extent, which are relatively non-reversible under the reaction conditions desirable. Some of these side reactions are as follows, where the alcohol is methanol:

$$CH_3OH \rightleftharpoons CO + 2H_2 - \Delta \qquad (7)$$

$$CO + H_2O \rightleftharpoons CO_2 + H_2 + \Delta \qquad (8)$$

$$CH_3OH + CO \rightleftharpoons CO_2 + CH_4 + \Delta \qquad (9)$$

The major objective of the process described herein is to provide conditions which favor the formation of mercaptans in preference to sulfides when the mercaptans are primarily desired, and to favor the formation of sulfides in preference to mercaptans when the sulfides are primarily desired.

Another objective is to provide economical and convenient methods for controlling the exothermic heat of reaction whereby the process may be operated adiabatically.

A specific object is to provide catalysts which favor the formation of mercaptans in preference to sulfides.

Conversely, another specific objective is to provide catalysts which favor the formation of sulfides in preference to mercaptans.

Another object of the invention is to provide economical and convenient methods for separating and recovering the reaction products.

A further object is to provide reaction conditions which favor the formation of mercaptans and/or sulfides, and exclude as far as possible the formation of decomposition products as shown in Equations 7, 8 and 9, and oxy-ethers as shown in Equation 2. These and other objects are achieved by the procedures hereinafter described.

The general reaction set forth in Equation 1 above is well known. Sabatier (Comptes rendus 150, 1219) shows the reaction of methanol with hydrogen sulfide at 300–360° C. over a thoria catalyst to produce methyl mercaptan. The same reaction was also studied by Kramer et al. (J. A. C. S. 43, 880) employing butanol and methanol, a thoria catalyst and temperatures of about 380° C. Yields of mercaptans ranging between about 30 and 50% are reported. In the above references the molar ratio of hydrogen sulfide to alkanol was about 1 to 1. Subsequent patent literature discloses similar processes conducted in the presence of large excesses of hydrogen sulfide, and employing a variety of metal oxide catalysts.

From an inspection of the above equations it might be presumed on theoretical grounds that the formation of mercaptan would be favored in preference to the sulfide by employing a molar excess of hydrogen sulfide over the amount theoretically required for Equation 1. This would tend to repress the formation of sulfides by shifting the equilibrium of the reaction shown in Equation 5 to the left. Alternatively, it might appear also that the presence of an excess of the alkyl sulfide would shift the equilibrium of Reactions 3, 4, 5 and 6 to the left, thereby favoring the formation of mercaptans. However, the feasibility of employing such equilibrium-shifting measures is difficult to predict from the theoretical aspects alone, especially in view of the multiplicity of possible reactions, and the presence of a catalyst which may influence some of those reactions more than others. The use of excess hydrogen sulfide to favor the formation of mercaptan would appear obvious as a simple application of the law of mass action since mercaptans require one mole of hydrogen sulfide per mole of alcohol, whereas the sulfides require only one-half mole of hydrogen sulfide. It has been found however that it is not possible to completely repress sulfide formation even though large excesses of hydrogen sulfide are employed, ranging up to 20 moles per mole of alkanol.

The feasibility of employing an excess of the sulfide depends for one thing upon the position of equilibrium which is attained in Reactions 3, 5 and 6 above. If the equilibrium is far to the right, such massive quantities of sulfide might be required as to render the procedure impractical. In other words the practicability of employing an excess of sulfide depends upon the relative velocities of the opposing reactions under the specific conditions of catalyst, temperatures, pressures, etc. In the present case, it has been found that when it is desired to produce mercaptans under the conditions recited, the formation of sulfides may be substantially completely repressed by including in the initial reaction mixture about 5 to 10 moles of the sulfide per mole of alcohol. It is found moreover that the presence of such amounts of sulfide in the reaction mixture gives no overall increase in the proportion of decomposition products formed. There is in fact a substantial increase in yield of mercaptan based on the original alkanol, as compared to similar operations employing an excess of hydrogen sulfide.

It has been found also that there is a concomitant requirement as to the permissible ratio of hydrogen sulfide to be employed when it is desired to maintain a continuous recycle of the stated proportion of sulfide. If more than about 3 moles of hydrogen sulfide per mole of alcohol is employed, the recycle sulfide at equilibrium will be reduced to a low constant level by conversion to the mercaptan. On the other hand, if less than about one mole of hydrogen sulfide per mole of alcohol is employed, the sulfide level will rise to an undesirably high level, and the yield of mercaptan drops off. It is therefore preferred to employ between about 1 and 3 moles of hydrogen sulfide per mole of monohydric alcohol, and concomitantly maintain an equilibrium recycle of sulfide amounting to between about 5 and 10 moles thereof per mole of alcohol. Generally the higher mole-ratios of sulfide i. e. between about 7 and 10, are employed in conjunction with the lower hydrogen sulfide mole-ratios, i. e. about 1. This combination is generally optimum for producing methyl mercaptan, while lower sulfide ratios i. e. between about 5 and 7, together with higher hydrogen sulfide ratios, i. e. between about 2 and 3, are preferred when higher mercaptans such as ethanethiol or propanethiol are being produced.

In addition to repressing the formation of sulfides, the presence of the specified proportions of sulfides in the reaction mixture is found to result in other unexpected improvements. The reaction set forth in Equation 1 above, which is the basic reaction desired, is exothermic, liberating about 19 kg. cal. per mole of methyl mercaptan produced. Since it is necessary as a practical matter to keep the temperature of the reaction mixture between about 600° and 1200° F. a definite temperature control problem is presented. If the temperature rises above 1200° extensive decomposition occurs. Temperatures below 600° F. result in the formation of large amounts of oxy-ethers as shown in Equation 2. It is therefore desirable to initiate the reaction at above about 600° F., and complete it at below about 1200° F. if mercaptans are primarily desired. If it is assumed that the average specific heat of a reaction mixture comprising equimolar quantities of methanol and hydrogen sulfide is 0.3, the complete reaction of such a mixture to form methyl mercaptan, from an initial temperature of 600° F., would result in raising the temperature of the reaction products to about 2000° F., neglecting any heat consumption in simultaneous endothermic reactions. If an excess of 5 moles of hydrogen sulfide is employed, the temperature rise would be approximately from 600° to 1229° F., assuming a specific heat of 0.23° for hydrogen sulfide. It is found however that if, instead of employing an excess of hydrogen sulfide, the stated excess of methyl sulfide is employed the reaction temperature is very easily controlled, permitting adiabatic operation. For example, a reaction mixture containing 8 moles of methyl sulfide per mole of methanol, and equimolar proportions of methanol and hydrogen sulfide, will undergo a temperature rise of only about 160° F. Six moles of methyl sulfide under similar conditions will result in a temperature rise of about 206° F. Therefore, if the reaction is initiated at between about 600° and 800° F. such mixtures may be completely reacted under adiabatic conditions without undue decomposition.

In addition to the thermal advantages of employing a recycle stream of sulfide, there are other advantages. For example it is found that the sulfides are good solvents for the mercaptans and excess hydrogen sulfide. This factor therefore permits a recovery system which may operate at atmospheric pressure or thereabouts. It is only necessary to cool the reaction mixture to the condensation point of the sulfide, thereby forming a solution of mercaptan and hydrogen sulfide at low pressures. This mixture may then be treated by distillation at atmospheric pressure for recovery of the various products as will be more particularly described hereinafter. If no recycle sulfide were employed, the recovery system would need to be operated at either sub-atmospheric temperatures or super-atmospheric pressures, thereby adding to the expense.

Moreover, the excess sulfide serves another advantage in the recovery system in that it is a selective solvent for hydrogen sulfide and mercaptan as compared to the aqueous phase which is formed upon condensation of the reaction mixture. In the absence of a sulfide, the aqueous phase, though small in volume compared to the organic phase, would dissolve an appreciable amount of mercaptan and hydrogen sulfide, thereby complicating the recovery. Under the conditions described, however, the aqueous phase is found to be substantially free of mercaptan, and may therefore be discarded if desired.

The reaction conditions which are conducive to the formation of sulfides are different in nearly every respect from those which are optimum for producing mercaptans. As indicated in the foregoing equations, a molar excess of methanol over hydrogen sulfide is a fundamental requirement. Preferably the mole ratio of hydrogen sulfide to methanol should be between about 0.2 and 1, although other proportions may be employed by varying the proportion of recycle mercaptan in the reaction mixture. The sulfide producing reactions are exothermic to a similar degree as the mercaptan producing reactions, and the same general temperature control measures may be employed. Such measures consist mainly in recycling any methyl mercaptan which may be produced during the process. However, in the case of sulfides, the selectivity of the catalysts which are employed is so great that the production of mercaptans can be almost eliminated even without any mercaptan recycling. These catalysts will be more particularly described hereinafter.

The temperatures to be employed for sulfide production are similar to those employed in producing mercaptans, but the optimum ranges for best results in each case are somewhat different. The sulfide producing reactions are most favored at temperatures between about 580° and 820° F., while the mercaptan reaction is most favored at temperatures ranging between about 700° and 1100° F. Moreover, since the sulfide reaction apparently proceeds through the intermediate production of oxy-ethers as shown in Equations 2 and 3, and since the oxy-ethers are preferentially formed at temperatures below 580° F., the sulfide forming process may be operated in two stages, the first stage at below 580° F., e. g. about 500° F., to favor the formation of oxy-ether in preference to mercaptans, and the second stage at above 580° to promote the conversion of the oxy-ethers to the sulfide. This result may be accomplished either by carrying out the reaction in two separate reactors maintained at different temperatures, or by simply maintaining a suitable temperature gradient in a single reaction vessel. In any event, to achieve best results, the contact time in the low temperature zone, i. e. below 580° F., should be between about 0.01 and 0.3 second, and the contact time in the high temperature zone, i. e. 580°–820° F., should be between about 0.01 and 1.0 second. The effects of temperature as well as hydrogen sulfide concentration will be more clearly evident from the following example. This example however represents exploratory runs, and not the optimum conditions which are claimed herein.

EXAMPLE I

A vertical tube furnace reactor one inch in diameter was filled with 100 ml. of an activated alumina catalyst which was stabilized with 5% of co-precipitated silica. The catalyst was in the form of ⅛ inch pellets. Various feed mixtures having the composition shown in Table I were vaporized and preheated to the reaction temperature and introduced into the reactor at the rate of approximately 2 gm. moles of methanol (64 gms.) per hour.

The reaction pressure was atmospheric. The results obtained were as follows:

Table I

| Run No. | Temp., °F., Bed. Av. | Mol Ratio, H₂S/CH₃OH | Make Gas Analysis, Mol Percent ||||||||| Mol Percent Yield From CH₃OH* |||
|---|---|---|---|---|---|---|---|---|---|---|---|---|---|---|
| | | | H₂S | CH₃OH | CH₃SH | (CH₃)₂S | (CH₃)₂O | CO₂ | CO | H₂O | Other | CH₃SH | (CH₃)₂S | (CH₃)₂O |
| 1 | 731 | 2.6 | 74.7 | 0.1 | 16.0 | 8.3 | 0 | 0.1 | 0.3 | 0.4 | C₃—0.1 | 48 | 50 | 0 |
| 2 | 676 | 11.7 | 89.3 | 0 | 5.9 | 1.2 | 0.1 | 0.1 | 0.6 | 2.6 | C₃—0.1, C₂—0.1 | 61 | 24.8 | 2 |
| 3 | 516 | 5 | 87.6 | 1.8 | 4.1 | 0.9 | 5.1 | 0.4 | 0 | 0 | (CH₃)₂CO—0.1 | 22 | 10 | 55 |
| 4 | 603 | 5 | 83.9 | 0.5 | 10.6 | 4.0 | 0.7 | 0.1 | 0.2 | 0 | | 52 | 39.5 | 6.9 |
| 5 | 711 | 5 | 85.5 | 0.1 | 10.3 | 3.0 | 0 | 0.1 | 0 | 0.1 | C₃ and C₄—0.2 | 61 | 35.5 | 0 |
| 6 | 873 | 5 | 82.6 | 0 | 13.3 | 3.2 | 0 | 0.1 | 0.4 | 0 | H₂—0.3 | 66 | 31.5 | 0 |

* Based on carbon material balance in make-gas.

Figure 2:
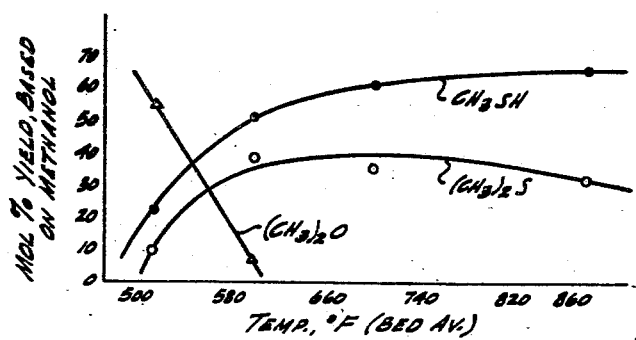

By comparing run numbers 1 and 2 in the above table it will be seen that the low ratio of hydrogen sulfide in run number 1 favors the production of methyl sulfide. It will be seen also that the low temperature in run number 3 favors the formation of methyl ether. Run numbers 3, 4, 5 and 6 show the effect of different temperatures on the proportion of products in the off-gases. The data from these last four runs is represented in graphic form in Figure 2. Referring to that figure, it will be seen that as the temperature rises above about 700° F. the proportion of sulfide in the product begins to fall off while the mercaptan concentration continues to rise. This data shows also that it is not possible to entirely repress the formation of sulfides by merely employing an excess (5/1) of hydrogen sulfide. In each of the above runs the net production of sulfide may be repressed to practically zero by recycling the proper proportion of methyl sulfide. The catalyst employed in the above example is a mercaptan-favoring type since it has very slight acidic properties.

As indicated above, the proper selection of a catalyst is highly important in obtaining the desired selectivity of reaction. It is found that the acidic type catalysts tend to accelerate those reactions which result in the ultimate formation of sulfides to a much greater extent than those which result in mercaptan formation. Conversely, the non-acidic, neutral catalysts are more selective in promoting mercaptan formation as opposed to sulfides. The acidic catalysts are those commonly known in the art as cracking catalysts, which, according to one theory, operate through the medium of carbonium ions. The best known examples of such catalysts are the composite oxides which contain a substantial proportion of silica or boria, for example silica-magnesia, silica-alumina, silica-zirconia-alumina, alumina-boria, and the acid activated clays, preferably of the acid-treated montmorillonite type. Silica gel alone however is not acidic in nature, and only becomes acidic upon admixture with the proper proportions of adsorptive metallic oxides. Such adsorptive oxides should preferably contain more than about 5% of silica, for example about 10% to 90%. Materials such as co-precipitated alumina-silica which contain only about 5% or less of silica are found to be essentially non-acidic in character and therefore favor the formation of mercaptans.

Another important type of acidic catalyst comprises those oxides which have been impregnated with an acidic material such as hydrofluoric acid, hydrochloric acid, etc. These acids may be impregnated on for example alumina, silica, titania, zirconia, magnesia or the natural clays. In preparing such acid treated catalysts the carrier is first soaked in the acid solution, drained, and then dried without washing in order to retain some of the acid on the carrier. Finally the dried carrier is activated by heating at for example 600° to 1500° F. for three to twelve hours.

The non-acidic catalysts which are employed herein for producing mercaptans consist primarily of the substantially neutral metal oxides such as activated alumina, magnesia, titania, or clays such as bauxite. These oxides however should not contain appreciable amounts of acidic oxides such as silica or boria. Up to about 8 to 10% of silica may be tolerated in aluminas for example without forming a typically acid catalyst. It is sometimes desirable in fact to incorporate a small percentage of silica, e. g. 5% in order to provide a more heat stable form of catalyst. Such silica stabilized catalysts are described more particularly in U. S. Patent No. 2,437,532. In addition to the oxide type catalysts, other substantially neutral adsorptive materials may be employed in the mercaptan reaction, such for example as activated carbon or charcoal.

In addition to the primary adsorptive oxide, the mercaptan-favoring catalysts may contain other metallic oxides or sulfides such for example as the oxides or sulfides of chromium, molybdenum, tungsten, iron, cobalt, nickel, copper, tin, cadmium, etc. These promoters may be added to the primary catalyst by any of the methods known in the art, e. g. impregnation with aqueous solutions of their salts, co-pilling of the powdered materials, co-precipitation, sublimation, etc. For the mercaptan reaction, proportions of such metal oxides ranging between about 1% and 20% by weight may be employed. The use of such additional metal oxides on the acidic sulfide-forming catalyst is usually undesirable, although in some cases small amounts, e. g. 1% to 5% may be employed. To illustrate the effect of catalyst composition on the relative proportions of mercaptan and sulfide which may be formed, the following example is cited:

EXAMPLE II

Four different catalysts were prepared and tested in 100 ml. lots in a reactor similar to that described in Example I, and under the following operating conditions:

Pressure_____ Atmospheric.
Temperature_____ 850–900° F.
Feed rate_____ 802 gms./hr. (2 gm. moles CH₃OH/hr.)
Feed composition_____ 20 mole percent CH₃OH; 80 mole percent H₂S.

The catalysts tested were as follows:

*Catalyst 1.*—A 95% alumina-5% silica gel composite prepared by co-precipitation of an aqueous mixture of sodium aluminate and sodium silicate with carbon dioxide. The precipitate was washed, dried at 90–110° C., activated by heating for two hours at 1100° F. and then formed into ⅛ inch pellets.

*Catalyst 2.*—A substantially pure precipitated alumina gel, activated at about 1100° F. and formed into ⅛ inch pellets.

*Catalyst 3.*—A synthetic, activated silica-alumina gel composite in the form of ⅛ inch pellets, containing about 85% by weight of silica.

*Catalyst 4.*—Same as catalyst No. 3, except that the pellets were steamed for 48 hours at 1000° F. to reduce the destructive cracking centers.

The make-gas analyses for the four runs were as follows:

*Table II*

| Catalyst No. | Mole percent | | | | | | | Mole ratio, $CH_3SH/(CH_3)_2S$ |
|---|---|---|---|---|---|---|---|---|
| | $H_2S$ | $CH_3SH$ | $(CH_3)_2S$ | $(CH_3)_2O$ | $CO_2$ | $CO$ | $H_2$ | |
| 1 | 80.6 | 13.7 | 2.8 | 0 | 0.3 | 0.2 | 1.2 | 4.89 |
| 2 | 82.8 | 12.2 | 2.2 | 0 | 0.3 | 0.3 | 1.0 | 5.55 |
| 3 | 89.3 | 3.4 | 5.6 | 0.2 | 0.1 | 0.1 | 0.4 | 0.61 |
| 4 | 88.3 | 3.7 | 5.4 | 0.2 | 0.2 | 0.1 | 1.2 | 0.68 |

These results demonstrate clearly the remarkable selectivity of the two types of catalyst described herein for promoting the respective reactions, even in the presence of an excess of hydrogen sulfide, and with no product recycle. By employing suitable product recycle of methyl sulfide or methyl mercaptan, the yields of mercaptan or sulfide respectively may be still further increased. It should be noted that while catalysts 3 and 4 show substantially the same initial activity, the steamed catalyst (No. 4) remains free of coke deposits for a substantially longer on-stream cycle than does catalyst No. 3.

Any of the catalysts described herein may require periodic regeneration by combustion with oxygen or air to remove coke deposits. Upon regeneration at 900–1500° F. in the presence of air or oxygen, the catalysts are restored to substantially their original activity.

Reference is now made to the attached Figure I which illustrates semi-diagrammatically a suitable arrangement of apparatus for carrying out either the sulfide or the mercaptan reaction. In the illustrated procedure the feed mixture, comprising for example methanol and hydrogen sulfide, is brought in through line 1, passed through a heat exchanger 2 wherein it is heated to reaction temperature by suitable heat exchange with the reaction products, and is then passed through line 3 into the top of an insulated tubular reactor 4 which is packed with a suitable catalyst 5. The reactor may be of any desired dimensions, and may include heat control or heat distributing devices (not shown) to maintain the desired temperature level, or temperature gradient. Reaction pressures from atmospheric to about 500 p. s. i. g. may be employed, preferably between 50 and 300 p. s. i. g. The reactor illustrated is designed particularly for adiabatic operation, and under such conditions there is ordinarily a temperature gradient over at least the first part of the reactor. The flow rate of reactants through the reactor should be such as to maintain a total contact time of between about 0.005 and 10.0 seconds, and preferably between 0.01 and 1.0 second.

The hot reaction products are withdrawn through line 6 and passed in heat exchange relationship with the feed materials through heat exchanger 2, and thence through line 7, condenser 8, and line 9 to decanter 10. The condenser 8 may be unnecessary if the entering feed material is sufficiently cool to condense the product gases in heat exchanger 2. The condensed products in decanter 10 comprise an aqueous phase 11 and an organic phase 12. The aqueous phase may be periodically or continuously drawn off by opening valve 13, and a pressure relief valve 14 may be employed to take off gaseous products if desired. The organic phase in decanter 10 is withdrawn through line 15 and transferred to distillation column 16 wherein the materials boiling lower than the methyl sulfide are taken off overhead through line 17 for further fractionation in column 18. The bottoms from column 16 consists predominantly of methyl sulfide together with small proportions of methanol and any higher boiling compounds. If the desired product is methyl sulfide, the bottoms product is drawn off through line 19 and subjected to a washing procedure at 20 to give pure methyl sulfide. A redistillation of the product may be desirable in some cases to eliminate high boiling products. If the desired product is methyl mercaptan, the methyl sulfide botts from column 16 is diverted through line 21 to a storage tank 22 where it is utilized for recycle as will be more particularly described hereinafter.

The bottoms from column 18 consists of substantially pure methyl mercaptan which may be withdrawn through line 23 and subjected to a final washing treatment at 24. If however the process is being operated to produce primarily methyl sulfide, all or a part of the mercaptan is diverted through line 25 to storage tank 22 wherein it is utilized for recycle as hereinafter described. The overhead from column 18 consists predominantly of gaseous materials, i. e. hydrogen sulfide, carbon monoxide, carbon dioxide, hydrogen, methane, ethane, etc. If the process is being operated without a molar excess of hydrogen sulfide the overhead from column 18 may be so lean in that product that it may be simply vented, or utilized as fuel gas. However, if it is desired to recover the hydrogen sulfide for recycling, the column 18 overhead may be withdrawn through line 26, compressed by means of pump 27, passed through a preliminary cooler 28, and finally fractionally condensed in gas-expansion heat exchanger 29. The liquefied hydrogen sulfide then accumulates in storage tank 30, while the fixed gases, carbon monoxide, carbon dioxide, hydrogen, methane, etc. may be periodically withdrawn by opening pressure relief valve 31. The liquefied hydrogen sulfide is withdrawn through pressure control valve 32 from which it is expanded through line 33, thereby providing gas-expansion refrigeration for heat exchanger 29. The gaseous hydrogen sulfide is then passed via line 34 to storage tank 22 wherein it is dissolved in the accumulated methyl sulfide or methyl mercaptan. This whole mixture may then be recycled through line 35 to be admixed with incoming feed in line 1.

The above procedure and apparatus may obviously be modified in many of the engineering details described, and should therefore be considered as illustrative only.

The following examples may serve to illustrate more specifically the preferred operating conditions, and the results obtainable thereby.

EXAMPLE III.—METHYL MERCAPTAN

A reactor similar to that described in Example I, and insulated for adiabatic operation, is filled with 100 ml. of an essentially pure precipitated alumina gel in the form of ⅛ inch calcined pellets. A feed mixture made up of 80 mole percent methyl sulfide, 10 mole percent methanol and 10 mole percent hydrogen sulfide is vaporized and preheated to a reaction temperature of about 720° F. The hot mixture is then passed at atmospheric pressure through the reactor at the rate of about 500 gms. per hour (contact time 0.2–0.35 sec.). The reaction gases are removed at a temperature of about 880° F. and passed through a water cooled condenser into a flask immersed in an alcohol-dry ice bath. The condensed water phase is removed by decantation, and the organic phase is resolved by distillation and found to contain methyl mercaptan in about 90% yield based on the original methanol. Essentially all of the original methyl sulfide is recovered.

When a feed mixture containing 60 mole percent of methyl sulfide, 10 mole percent methanol and 30 mole percent hydrogen sulfide is treated under conditions similar to the foregoing, methyl mercaptan is obtained in about 80% yield.

EXAMPLE IV.—METHYL SULFIDE

The same reactor described in Example III is packed with ⅛ inch pellets of an acid-treated montmorillonite clay available under the trade-name of Filtrol (50–60% $SiO_2$). A feed mixture made up of 30 mole percent methanol, 15 mole percent hydrogen sulfide and 55 mole percent methyl mercaptan is vaporized and preheated to an initial reaction temperature of about 500° F. This mixture is then passed at atmosphere pressure through the reactor at the rate of about 450 gms. per hour (total contact time 0.2–0.3 sec.). The reacted mixture is then precooled in a water condenser and condensed in a Dry-Ice cooled flask. Upon distillation, substantially all the original methyl mercaptan is recovered, and the yield of methyl sulfide is about 91% based on the methanol charged.

If the foregoing procedure is repeated except that the feed mixture is introduced to the reactor at a higher initial temperature, e. g. 750° F., a slight reduction in yield of methyl sulfide is noted, and somewhat more than the original methyl mercaptan charged is recovered. This shows that low initial temperatures favor the ultimate production of sulfide rather than mercaptan.

By substituting other acid type cracking catalysts for the Filtrol employed above, e. g. alumina-silica containing 60% silica, or silica-magnesia containing 70% silica, substantially the same results are obtained.

The foregoing disclosure is not to be considered as limiting the scope of the invention since many variations may be made by those skilled in the art without departing from the scope or spirit of the following claims.

I claim:

1. A process for preparing a lower alkyl sulfide which comprises contacting a gaseous feed mixture comprising a lower alkanol plus hydrogen sulfide with an acidic cracking catalyst at a reaction temperature between about 500° and 1200° F., and recovering alkyl sulfide from the reaction products, said cracking catalyst consisting essentially of (1) an adsorbent metallic oxide selected from the group consisting of alumina, magnesia, and zirconia, and (2) intimately admixed therewith an acid-forming component selected from the group consisting of silica, boria, and inorganic acids, sufficient of said acid-forming component being present to render said catalyst acidic under the said reaction conditions.

2. A process according to claim 1 wherein the reaction temperature is between about 580° and 820° F.

3. A process according to claim 1 wherein said catalyst is essentially an alumina-silica composite containing between about 10% and 90% by weight of silica.

4. A process according to claim 1 wherein said catalyst is essentially an acid treated montmorillonite type clay.

5. A process according to claim 1 wherein said catalyst is essentially an adsorptive oxide impregnated with an inorganic acid.

6. A process according to claim 1 wherein the mole ratio of hydrogen sulfide to alkanol in said feed mixture is between about 0.2 and 1.0.

7. A process according to claim 1 wherein the mole ratio of hydrogen sulfide to alkanol in said feed mixture is between about 0.2 and 1.0, and wherein the alkyl mercaptan produced in the said reaction is continuously recycled with said feed mixture.

8. A process for preparing methyl sulfide which comprises contacting a gaseous feed mixture comprising methanol plus hydrogen sulfide with an acidic cracking catalyst at a reaction temperature between about 500° and 1200° F., and recovering methyl sulfide from the reaction products, said cracking catalyst consisting essentially of (1) an adsorbent metallic oxide selected from the group consisting of alumina, magnesia, and zirconia, and (2) intimately admixed therewith an acid-forming component selected from the group consisting of silica, boria, and inorganic acids, sufficient of said acid-forming component being present to render said catalyst acidic under the said reaction conditions.

9. A process according to claim 8 wherein the mole ratio of hydrogen sulfide to methanol in said feed mixture is between about 0.2 and 1.0.

10. A process according to claim 8 wherein the mole ratio of hydrogen sulfide to methanol in said feed mixture is between about 0.2 and 1.0, and wherein the alkyl mercaptan produced in said reaction is continuously recycled with said feed mixture.

11. A process for preparing lower alkyl sulfides which comprises passing a vaporous feed mixture of a lower alkanol and hydrogen sulfide through a reaction zone containing an acidic cracking catalyst comprising an adsorptive metallic oxide and composited therewith an acid-forming adjuvant selected from the group consisting of inorganic acids and inorganic acidic oxides, the first portion of said reaction zone being maintained at a temperature below about 580° F., to favor the formation of alkyl oxy-ether, and the second portion thereof being maintained at a temperature between about 580° and 820° F., to favor the conversion of oxy-ether to alkyl sulfide, and recovering alkyl sulfide from the reaction products.

12. A process according to claim 11 wherein the contact time in the first portion of said reaction zone is between about 0.01 and 0.3 second and the contact time in the second portion of said reaction zone is between about 0.01 and 1 second.

13. A process for preparing methyl sulfide which comprises passing a vaporous feed mixture of methanol and hydrogen sulfide through a reaction zone containing an acidic cracking catalyst comprising an adsorptive metallic oxide and composited therewith an acid-forming adjuvant selected from the group consisting of inorganic acids and inorganic acidic oxides, the first portion of said reaction zone being maintained at a temperature below about 580° F. to favor the formation of methyl oxy-ether, and the second portion thereof being maintained at a temperature between about 580° and 820° F., to favor the conversion of methyl oxy-ether to methyl sulfide, and recovering methyl sulfide from the reaction products.

14. A process according to claim 13 wherein the contact time in the first portion of said reaction zone is between about 0.01 and 0.3 second and the contact time in the second portion of said reaction zone is between about 0.01 and 1 second.

References Cited in the file of this patent

UNITED STATES PATENTS

| Number | Name | Date |
|---|---|---|
| 2,116,182 | Baur | May 3, 1938 |
| 2,147,400 | Clark et al. | Feb. 14, 1939 |
| 2,366,453 | Meadow | Jan. 2, 1945 |
| 2,565,195 | Bell | Aug. 21, 1951 |
| 2,647,151 | Bell | July 28, 1953 |
| 2,667,515 | Beach | Jan. 26, 1954 |